United States Patent
Payne et al.

(10) Patent No.: US 12,008,581 B1
(45) Date of Patent: Jun. 11, 2024

(54) SYSTEM AND METHOD FOR MANAGING PIPELINE EQUIPMENT

(71) Applicant: Payne Managment, Inc, Mobile, AL (US)

(72) Inventors: Randle Payne, Mobile, AL (US); Daniel Payne, Mobile, AL (US)

(73) Assignee: Payne Management, Inc, Mobile, AL (US)

( * ) Notice: Subject to any disclaimer, the term of this patent is extended or adjusted under 35 U.S.C. 154(b) by 210 days.

(21) Appl. No.: 17/542,057

(22) Filed: Dec. 3, 2021

Related U.S. Application Data

(60) Provisional application No. 63/120,867, filed on Dec. 3, 2020.

(51) Int. Cl.
| | |
|---|---|
| *G06Q 30/018* | (2023.01) |
| *F16K 37/00* | (2006.01) |
| *G06Q 10/0631* | (2023.01) |
| *G06Q 50/06* | (2012.01) |

(52) U.S. Cl.
CPC ....... *G06Q 30/018* (2013.01); *F16K 37/0075* (2013.01); *G06Q 10/063112* (2013.01); *G06Q 50/06* (2013.01)

(58) Field of Classification Search
CPC ......... G06Q 30/018; G06Q 10/063112; G06Q 50/06; F16K 37/0075
See application file for complete search history.

(56) References Cited

U.S. PATENT DOCUMENTS

| | | | | |
|---|---|---|---|---|
| 2013/0338833 | A1* | 12/2013 | Medina | F17D 1/00 700/275 |
| 2016/0146971 | A1* | 5/2016 | Gerling | G01V 99/00 702/5 |

FOREIGN PATENT DOCUMENTS

| | | | | | |
|---|---|---|---|---|---|
| CN | 106485805 B | * | 11/2018 | ............... | G07C 1/20 |
| CN | 111771112 A | * | 10/2020 | ............ | G01M 3/002 |
| EP | 3276568 A1 | * | 1/2018 | ............ | G05B 19/29 |
| GB | 2513709 A | * | 11/2014 | ............ | G05B 11/01 |
| WO | WO-2021043039 A1 | * | 3/2021 | ........... | G01K 15/005 |

* cited by examiner

*Primary Examiner* — Florian M Zeender
*Assistant Examiner* — Emily M. Kraisinger
(74) *Attorney, Agent, or Firm* — AdamsIP, LLC; Edward Brinkley Garner; James Hunter Adams

(57) ABSTRACT

A system and method for managing pipeline operations, information, and equipment is provided. The system generally comprises a processor, pipeline equipment operably connected to the processor, power supply, and non-transitory computer-readable medium coupled to the processor and having instructions stored thereon. The system may also comprise a computing device having a user interface that may allow a user to view/alter data of the system. The system may advise users whether they are qualified to work on a piece of pipeline equipment and generate scores that rate the chance that pipeline equipment may pass inspection.

12 Claims, 8 Drawing Sheets

SYSTEM AND METHOD FOR MANAGING PIPELINE EQUIPMENT

FIELD OF THE DISCLOSURE

The subject matter of the present disclosure refers generally to a system and method for managing pipeline operations, information, and equipment.

BACKGROUND

Pipelines are a necessary feature of public utilities as they provide quick transportation of needed resources directly to consumers and/or to utilities who then provide said resources to said consumers. Unfortunately, many engineering challenges exist for pipelines, including, but not limited to, pipeline length and material; terrain and medium traversed by pipeline; properties of the fluid transported via the pipeline; and the climatic conditions to which the pipeline is exposed. In addition, a plurality of state and federal regulations has been created to ensure the effective management of these pipelines, which can sometimes be quite confusing and overwhelming considering the number of regulations that have been signed into law. When a state or federal agency performs an audit on these pipelines based on these state and federal regulations, it is not uncommon for an auditor to find at least one aspect of pipeline operations, information, and/or equipment that is not in compliance with whichever laws apply.

Currently, there are systems that assist in the management of pipeline regulation compliance, but most of these systems are fragmented in that they only address one problem related to pipeline risk management. For instance, there are systems that monitor which sections of a pipeline have been recently inspected. There are also systems that allow inspectors to receive certifications for training required to even qualify them to perform inspections on pipeline equipment. There are also systems that update managers of pipelines about the constantly changing state and federal regulations that apply to their pipeline systems. However, there are currently no systems that combine these risk management programs into a single package to provide a manager with the awareness needed to avoid any regulatory compliance failures their particular pipeline system may have. And even if there was a system that combined these features, it would still be difficult for a manager of a pipeline to measure the audit risk his pipeline may be under.

Therefore, there is a need in the art for a system and method that allows pipeline managers to manage pipelines remotely while also assessing the risk of a state and federal audit and generating a compliance score that may indicate what level of compliance the manager's pipeline system is in should an audit actually happen.

SUMMARY

A system and method for managing pipeline equipment and employees who manage said pipeline equipment of a pipeline system is provided. In one aspect, the system allows a user to manage pipeline equipment remotely using solenoid valves and at least one sensor that collects data concerning the pipeline equipment. In another aspect, the system manages pipeline inspections by employees and determines the probability certain pieces of pipeline equipment will pass inspection according to local, state, and federal rules and regulations. Generally, the system manages a pipeline system and the employees who manage said pipeline system and provide scores that indicate to a user the condition of pipeline equipment in said pipeline system.

The system generally comprises pipeline equipment, processor operably connected to the pipeline equipment, power supply, and non-transitory computer-readable medium coupled to the processor and having instructions stored thereon. The system may also comprise a computing entity having a user interface that allows a user to view data of the system and/or cause the system to perform an action based on commands input by said user. Users may input data regarding pipeline equipment via the user interface, and the system may save as equipment data within pipeline profiles. Using this equipment data and rules and regulations data, the system may use machine learning techniques or regression analysis to determine the chances that a particular piece of pipeline equipment might pass an inspection. In some preferred embodiments, the system may send a compute readable signal to a user instructing said user to perform an inspection on a piece of pipeline equipment. In other preferred embodiments, the system may use data collected by the at least one sensor to determine if any safety concerns exist within a pipeline system and subsequently shutdown any dangerous section of the pipeline system using solenoid valves connected to the system via a network.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
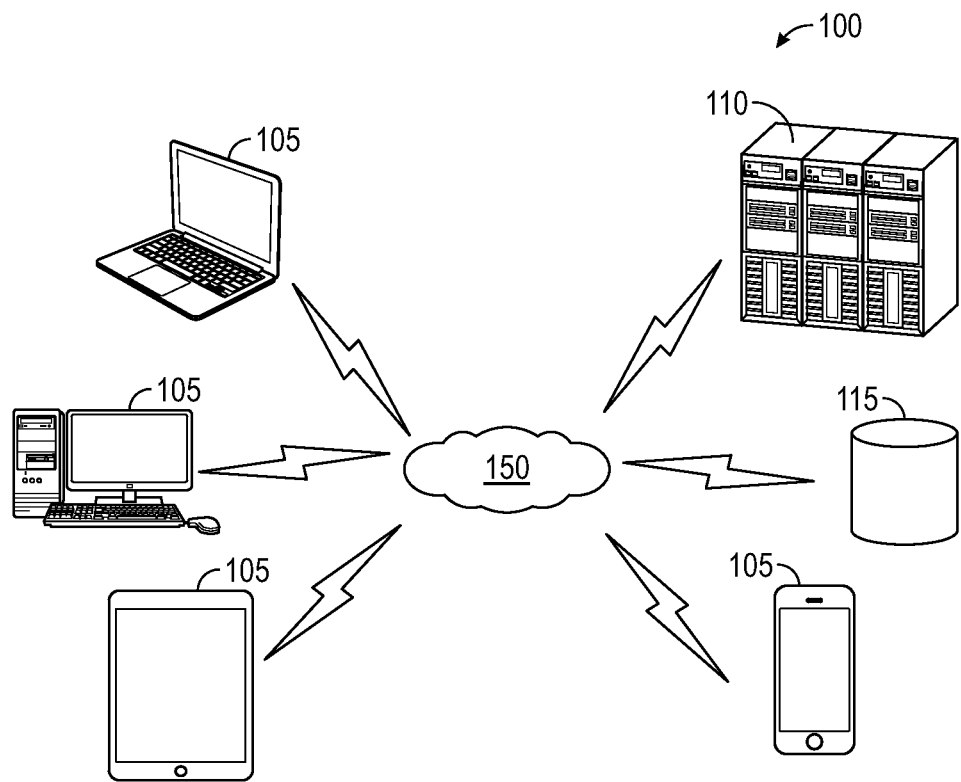
FIG. 1 is a diagram illustrating a system embodying features consistent with the principles of the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

A system 400 and method for managing pipeline operations, information, and equipment is provided. In one aspect, the system 400 allows users to remotely inspect pipeline equipment 413 in the field. In another aspect, the system 400 may be used to manage employees and/or third-parties whose job is to inspect said pipeline equipment 413. In yet another aspect, the system may grade a company's compliance with municipal, state, and federal rules and regulations regarding the upkeep of pipeline equipment 413. Generally, the system 400 allows users 405 to manage pipeline operations, information, equipment, employees, and third parties via a user interface 411 to ensure that the pipeline system meets statutorily mandated guidelines. The pipeline equipment 413 of the system 400 is grouped in a way that allows only certain users 405 control. Users 405 may further add sub-users to the system 400 who may also have access to the pipeline profiles 435 via the user interface 411, albeit in a limited capacity.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more computing devices 300 designed to index documents available through networks 150. Document indexing servers may access other servers 110, such as web servers that host the system 400, to index the equipment data 435A and employee data 430B. In some implementations, document indexing servers may index documents/records stored by other servers 110 connected to the network 150. Document indexing servers may, for example, store and index content, information, and documents relating to user profiles 430 and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
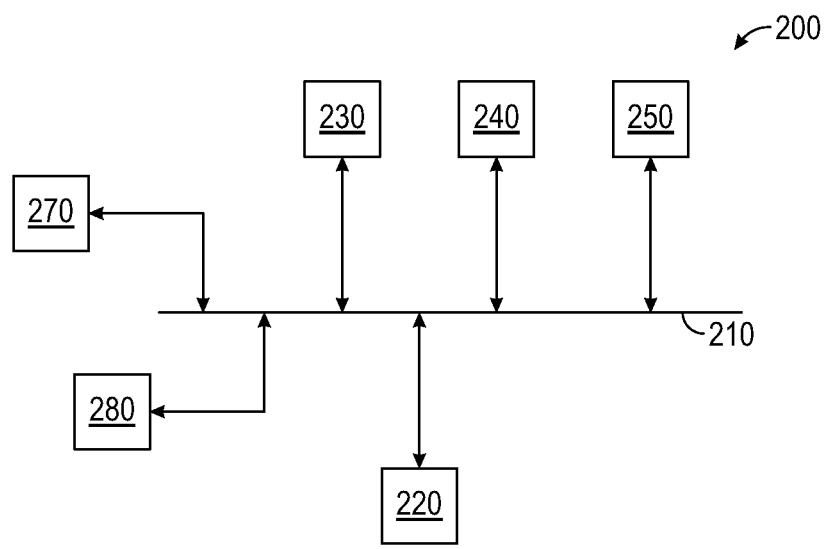
FIG. 2 is a diagram illustrating a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. In some embodiments, the processor 220 may have a memory device therein or coupled thereto suitable for storing inspection data 430A, employee data 430B, equipment data 435A, or other information or material disclosed herein. The processor 220 may provide for coordination of the other components of a computing entity 200, such as control of user interfaces 410, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
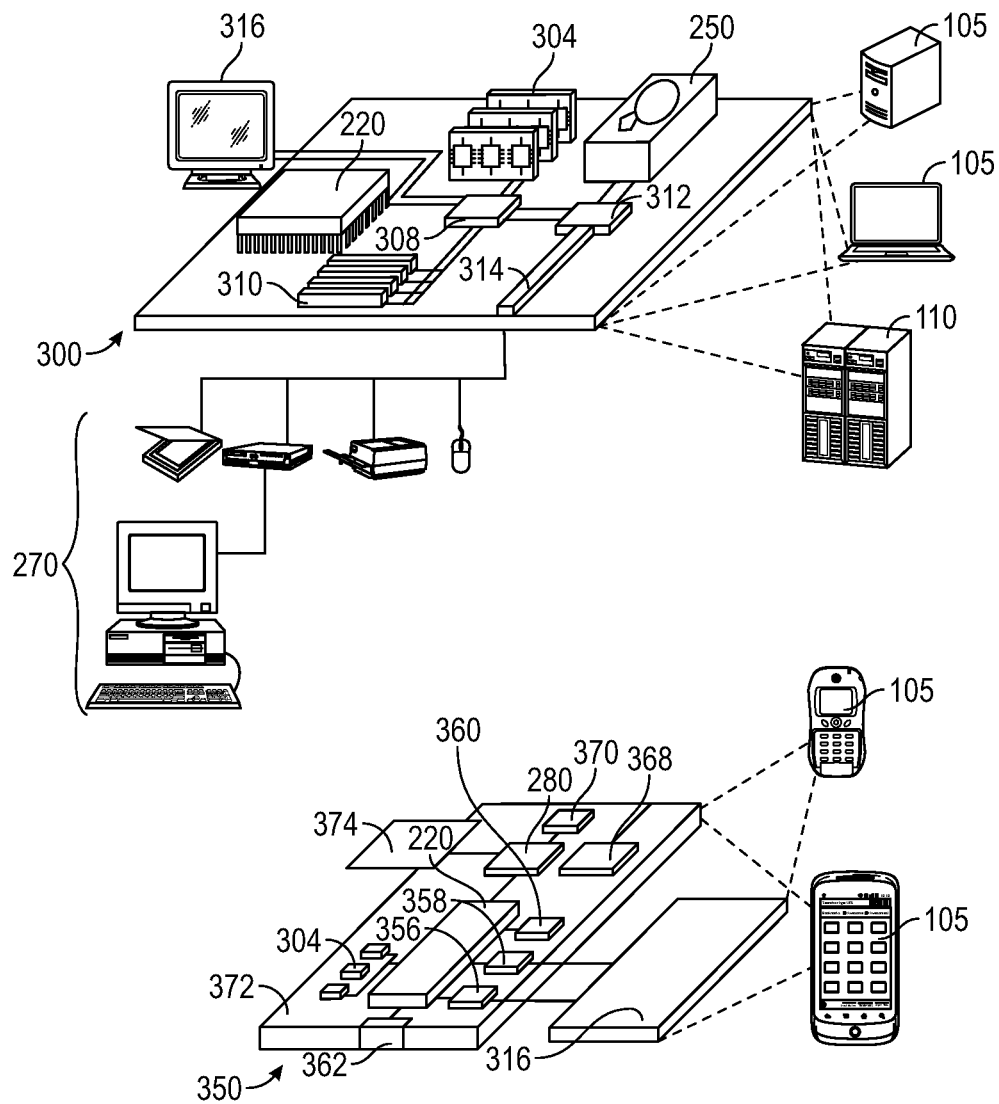
FIG. 3 is a diagram illustrating a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362.

The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 410, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation-and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with electricity. In one preferred embodiment, the system 400 may comprise of multiple power supplies that may provide power to the system 400 in different circumstances. For instance, the system 400 may be directly plugged into a stationary power source, which may provide power to the system 400 so long as it remains in one place. In a preferred embodiment, the stationary power source may be the electrical wiring that provides power to street lamps and utility meters. However, the system 400 may also be connected to a battery so that the system 400 may receive power even when it is not receiving power from a stationary power source. In this way, the system 400 may always receive power so that it may continuously update equipment data 435A and allow users to manage the pipeline equipment 413 remotely. In one preferred embodiment, the system 400 may present an emergency indicia within the display 316 when a backup battery is supplying power to the various components of the system 400. This may provide the user with information that may indicate a portion of a pipeline system that is experiencing some sort of stress. For instance, a flooded utility network having pipeline equipment 413 may experience a power outage that may cause the system 400 to use battery backup. This in turn may alert a user of the system 400 that this portion of the pipeline system is experiencing some sort of stress that may require inspection or remote cutoff of pipeline equipment 413 to avoid severe damage or loss of life. In other words, this alerts a user 405 of the system to be especially vigilant when monitoring this section of the pipeline system 400 due to abnormal circumstances.

Figure 4:
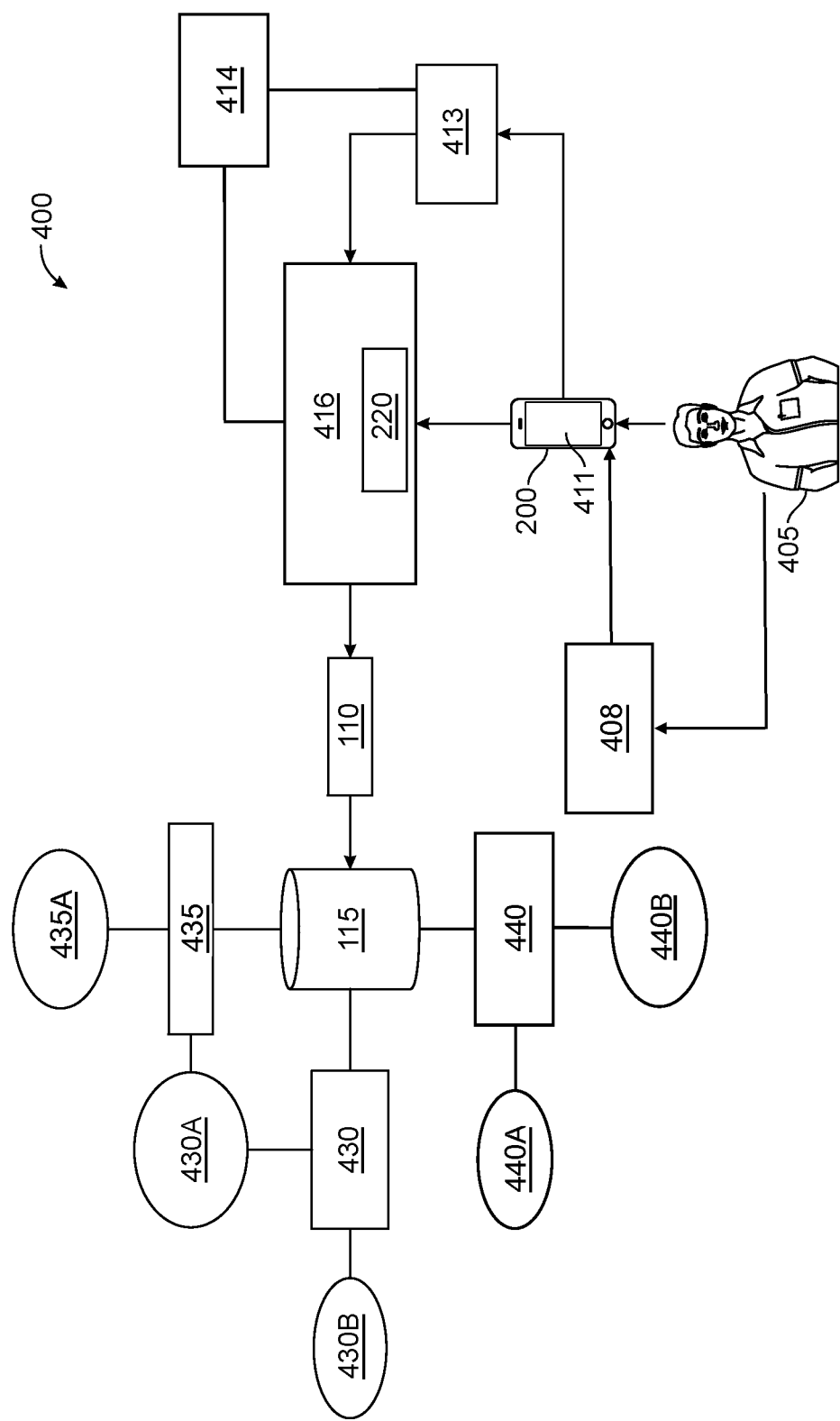
FIG. 4 is a diagram illustrating a system embodying features consistent with the principles of the present disclosure.
Figure 5:
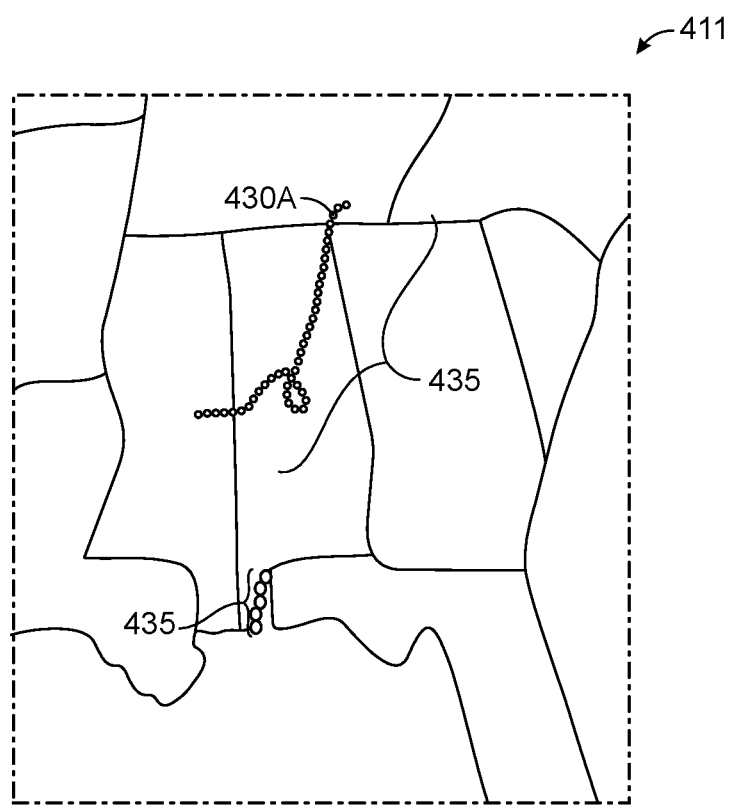
FIG. 5 is a diagram illustrating a user interface embodying features consistent with the principles of the present disclosure.
Figure 6:
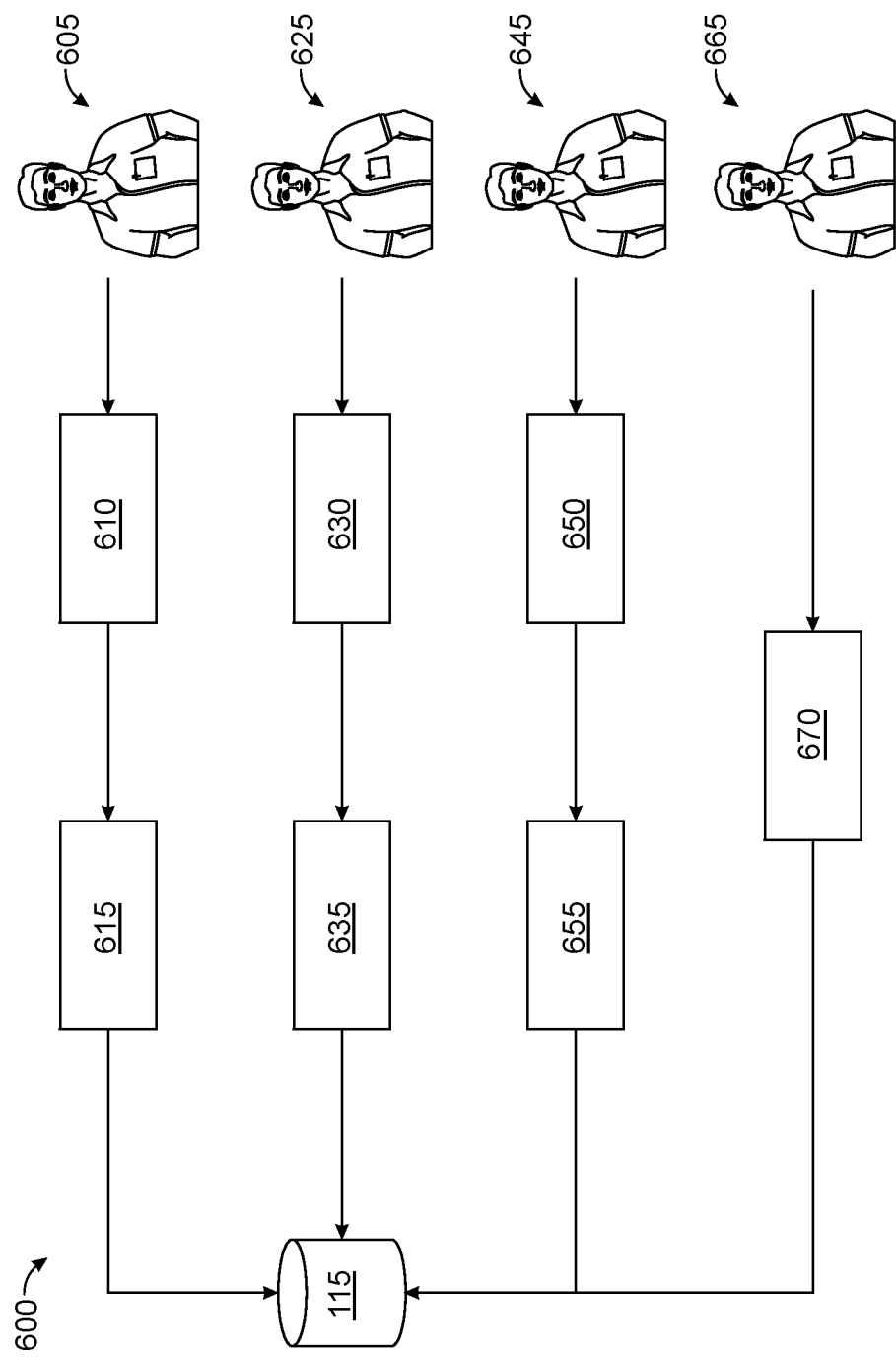
FIG. 6 is a diagram illustrating the manner in which individual access to data may be granted or limited based on permission levels.
Figure 7:
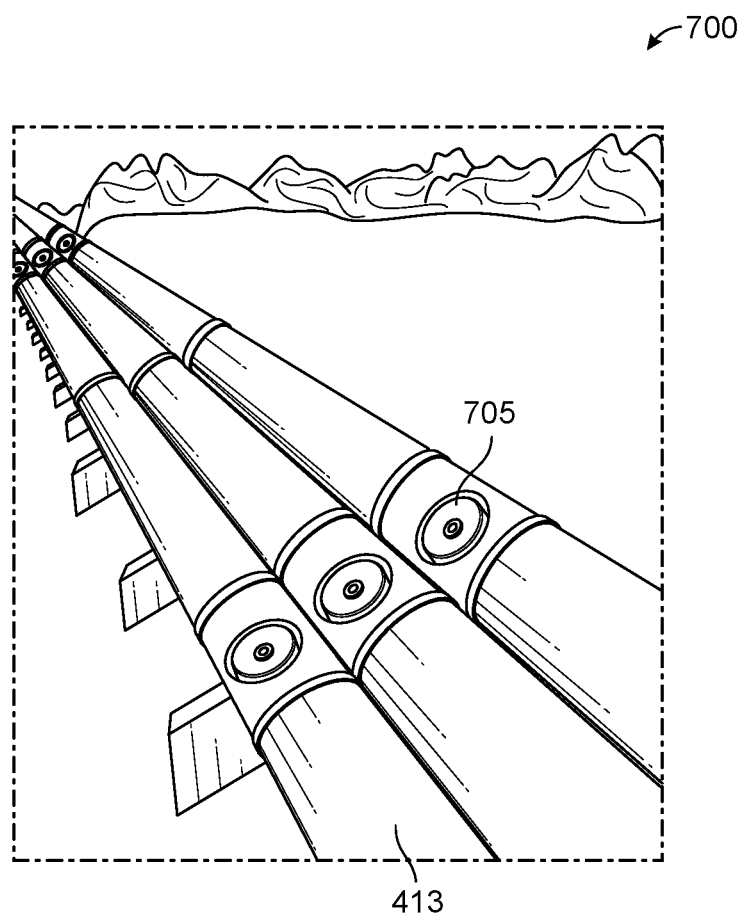
FIG. 7 is an illustration of the system being used within an environment.
Figure 8:
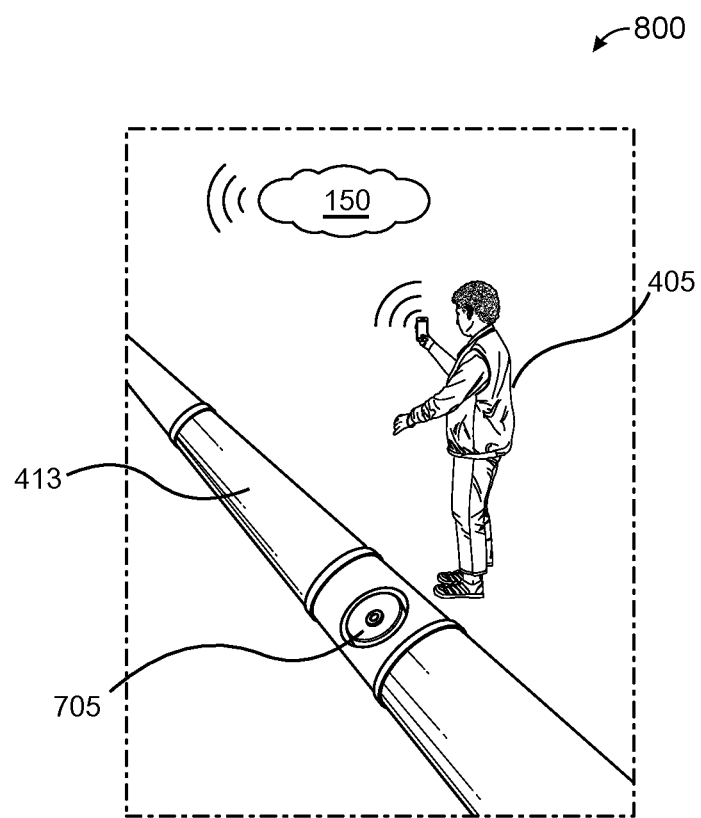
FIG. 8 is an illustration of the system being used within an environment.
Figure 9:
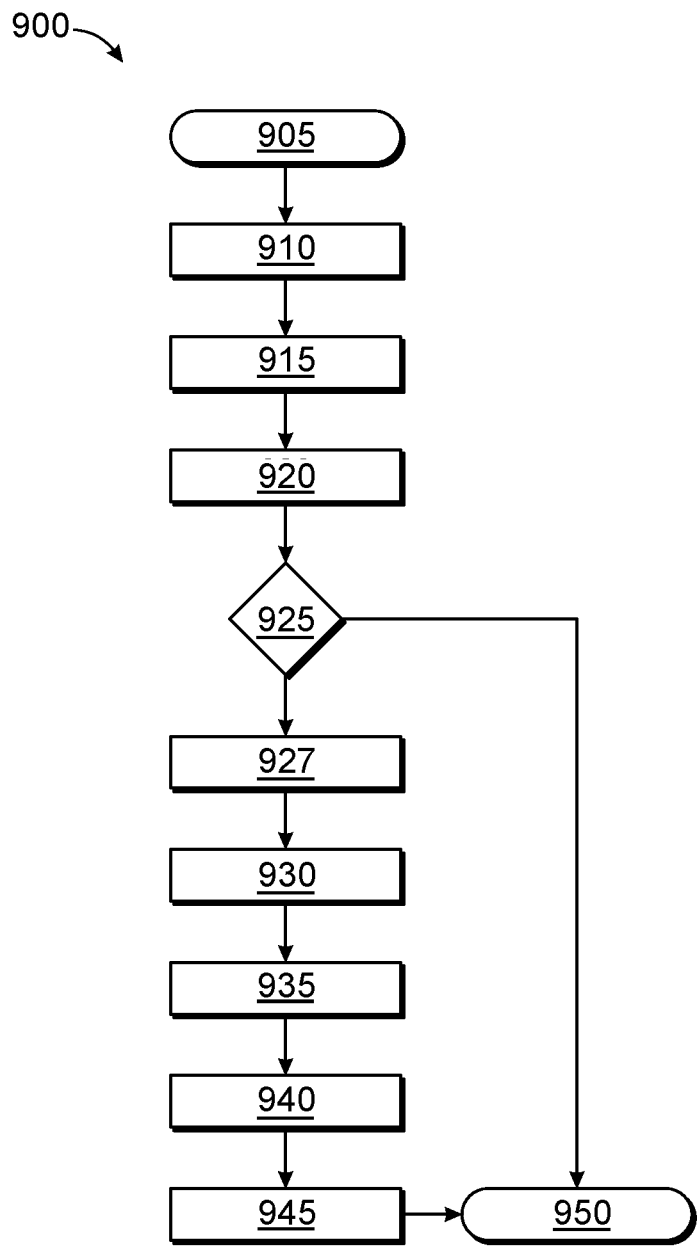
FIG. 9 is a flow chart illustrating certain method steps of a method embodying features consistent with the principles of the present disclosure.

FIGS. 4-9 illustrate embodiments of a system 400 for managing pipeline operations, information, and equipment remotely to prevent noncompliance with rules and regulations. FIG. 4 depicts a preferred embodiment of a system 400 designed to allow for the remote management of pipeline operations, information, and equipment. FIG. 5 illustrates an embodiment of a user interface 411 of the system 400. FIG. 6 illustrates permission levels 600 that may be utilized by the present system 400 for controlling access to content 615, 635, 655 of the system 400. FIG. 7 illustrates a first environment 700 with pipeline equipment 413 equipped with solenoid valves 705 that may be controlled remotely via the user interface 411 by a user. FIG. 8 illustrates the system 400 being used within a second environment 800 by a user 405 who is an employee. FIG. 9 illustrates methods that may be carried out by the system 400. It is understood that the various method steps associated with the methods of the present disclosure may be carried out as operations by the system 400 depicted in FIG. 4.

As illustrated in FIG. 4, the system 400 generally comprises pipeline equipment 413, processor 220 operably connected to the pipeline equipment 413, power supply, and non-transitory computer-readable medium 416 coupled to the processor 220 and having instructions stored thereon. In one embodiment, the system 400 may comprise a computing entity 200, wherein said computing entity 200 may comprise a user interface 411 that may allow a user 405 to view data of the system 400 and/or cause the system 400 to perform an action via commands input by said user 405. In another embodiment, the system 400 may comprise a database 115 operably connected to the processor 220, which may be used to store equipment data 435A and employee data 430B therein. In yet another preferred embodiment, a server 110 may be operably connected to the database 115 and processor 220, facilitating the transfer of information between the processor 220 and database 115. In yet another preferred embodiment, the system may comprise at least one solenoid valve 705 operably connected to said pipeline equipment 413, allowing a user remotely control the solenoid valve 705 via the user interface 411. The system 400 preferably transmits equipment data 435A to the processor 220 via a network 150 so that it may be presented to a user. In particular, the system 400 is designed to allow users 405 to manage pipeline equipment 413 and employees remotely. For instance, as illustrated in FIG. 8, an employee tasked by a user via the user interface 411 to inspect pipeline equipment 413 is performing his assigned task. In addition, the pipeline equipment 413 sends equipment data 435A to the system, instructing the system that it has recently been inspected.

In an embodiment, the programming instructions responsible for the operations carried out by the processor 220 are stored on a non-transitory computer-readable medium 416 ("CRM"), which may be coupled to the server 110, as illustrated in FIG. 4. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416.

Data within the system 400 may be stored in various profiles. In a preferred embodiment, the system 400 comprises equipment data 435A and employee data 430B that may be stored in user profiles 430 and pipeline profiles 435. Equipment data 435A may be defined as data that may be used to identify a particular piece of pipeline equipment 413 of the system 400. Equipment data 435A may include, but is not limited to, equipment type, date of last inspection, inspector name, compliance status, geolocation data, or any combination thereof. Employee data 430B may be defined as data that may be used to identify a particular employee within the system 400. Employee data 430B may include, but is not limited to, name, job responsibilities, certification, certification status, geolocation data, or any combination thereof.

A user profile 430 may be defined as a profile containing data about a particular user 405. The system 400 may separate user profiles 430 into groups and subgroups (or user roles 610, 630, 650). In a preferred embodiment, various groups and subgroups of the system 400 may grant permissions that give users 405 access to data and/or pipeline equipment 413 within the system 400. For instance, the user profile 430 of a user 405 who is a municipal worker may be granted permissions that allows the municipal worker to access all pipeline equipment 413 413 within the municipality via the user interface 411. A user profile 430 of a sub-user who owns a pipeline sub-contractor business in the municipal worker's jurisdiction may be granted permissions that grant the sub-contractor access to equipment data 435A of pipeline equipment 413 within the municipal worker's jurisdiction by placing the sub-contractor's sub-user profile in a group. Therefore, a user 405 of the system 400 may change what pipeline equipment 413 of the system 400 a sub-user may access by changing permissions of the sub-users. In one preferred embodiment, the system 400 may store equipment data 435A and employee data 430B in user profiles 430 and sub-profiles, which may allow the system 400 to associate a particular users 405 with particular pieces of pipeline equipment 413 as well as associate particular users with particular employees.

In one preferred embodiment, the system may further comprise rules and regulations data 440, which the system may use to determine whether pipeline equipment 413 has been inspected within the regulated time period and/or whether an employee is qualified to inspect said pipeline equipment 413. In one preferred embodiment, the system may alert a user if an employee scheduled to inspect a particular piece of pipeline equipment 413 is qualified to inspect said pipeline equipment 413. In another preferred embodiment, the system may alert a user as to whether or not they are qualified to inspect a particular piece of pipeline equipment 413. The user preferably receives an alert via the user interface 411 by way of an indicia. For instance, an inspector user may log into the system via the user interface 411 to perform an inspection, causing the processor 220 to retrieve training data associated with the inspector user's user profile 430 and compare it to rules and regulations data 440 to determine if the inspector user is qualified to perform said inspection. For instance, a managerial user using the user interface 411 to assign an inspection to an employee user of the system may perform a check that determines which employee users are qualified to perform the inspection and only present those qualified employee users to the managerial user within the user interface 411. For instance, the system may retrieve pipeline equipment data 435A relating to "date of last inspection" and compare that to rules and regulations data 440 to determine which pipeline equipment 413 is in danger of lapsing. In some preferred embodiments, the system may alert a user of which pipeline equipment 413 is in danger of lapsing, thus assisting the user in avoiding potential violations and fines from State and/or Federal regulator.

A pipeline profile 435 may be defined as a profile containing data about a particular collection of pipeline equipment 413. In a preferred embodiment, a pipeline profile 435 may comprise one or more pipeline profiles 435, wherein each pipeline profile 435 within the plurality of pipeline profiles 435 may represent at least one piece of pipeline equipment 413 associated with a particular user 405. For instance, a user 405 having permissions to manage pipelines within a geographic area may have a pipeline profile 435 that contains data on all pieces of pipeline equipment 413 within said geographic area. For instance, a user 405 having permissions to manage pipeline equipment 413 for a particular run of pipeline within a geographic area may divide said geographic area so that the pipeline equipment 413 within said geographic area are divided into multiple pipeline profiles 435. In one preferred embodiment, pipeline equipment 413 may be added to multiple pipeline profiles 435. Pipeline profiles 435 may be sorted into groups and subgroups, which may assign different permission levels 600 to the pipeline profiles 435. The permission levels 600 may be used by the system 400 to determine which users 405 may manage different sections of pipeline as divided within the pipeline profiles 435. For instance, pipeline profiles 435 grouped in the "municipal" group may allow municipal workers to use the user interface 411 to manage pipeline equipment 413 within a particular pipeline profile 435. For instance, pipeline profiles 435 grouped in the "county" group may only grant permissions to county workers to use the user interface 411 to manage pipeline equipment 413 within a particular pipeline profile 435.

As illustrated in FIG. 4, the system 400 may comprise a database 115 operably connected to the processor 220. The database 115 may be operably connected to the processor 220 via wired or wireless connection. In a preferred embodiment, the database 115 is configured to store equipment data 435A and employee data 430B therein. Alternatively, the equipment data 435A and employee data 430B may be stored on the non-transitory computer-readable medium 416. The database 115 may be a relational database such that the equipment data 435A and employee data 430B associated with each user profile 430 and pipeline profile 435 within the plurality of user profiles 430 and pipeline profiles 435 may be stored, at least in part, in one or more tables. Alternatively, the database 115 may be an object database such that equipment data 435A and employee data 430B associated with each user profile 430 and pipeline profile 435 within the plurality of user profiles 430 and pipeline profiles 435 may be stored, at least in part, as objects. In some instances, the database 115 may comprise a relational and/or object database and a server 110 dedicated solely to managing the equipment data 435A and employee data 430B in the manners disclosed herein.

In an embodiment, the system 400 may further comprise a user interface 411. A user interface 411 may be defined as a space where interactions between a user 405 and the system 400 may take place. In a preferred embodiment, the interactions may take place in a way such that a user 405 may control the operations of the system 400, and more specifically, allow a user 405 to monitor the pipeline equipment 413. A user 405 may input instructions to control operations of the system 400 manually using an input device 408. For instance, a user 405 may choose to schedule a certification compliant employee to inspect a particular piece of pipeline equipment 413 by using an input device 408 of the system 400, including, but not limited to, a keyboard, mouse, or touchscreen. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of tactile information via a haptic suit, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, haptic suits, speakers, and scent generating devices, or any combination thereof. In a preferred embodiment, users 405 may access data of the system 400 via the user interface 411, which may be accomplished by causing the processor 220 to query the non-transitory computer-readable medium 416 and/or database 115. The non-transitory computer-readable medium 416 and/or database 115 may then transmit data back to the processor 220, wherein the processor 220 may present it to the user 405 via a display 316. This information may be presented to the user 405 in a way such that the user 405 may choose which pipeline systems and/or pipeline equipment 413 to monitor.

As illustrated in FIG. 7, the pipeline equipment 413 may further comprise a solenoid valve 705 operably connected to the processor 220 via a network 150. In a preferred embodiment, the solenoid valve 705 allows a user to remotely cutoff flow to one or more pieces of pipeline equipment 413. For instance, as illustrated in FIG. 7, the solenoid valve 705 may allow a user to remotely cutoff gas flowing through a leaking section of pipeline. Equipment data 435A may be sent to the processor 220 that instructs the processor 220 that the one or more pieces of pipeline equipment 413 have been closed. In yet another preferred embodiment, the system 400 may further comprise a camera that allows users 405 to remotely monitor conditions about the pipeline equipment 413. In one preferred embodiment, select pieces of pipeline equipment 413 may have an associated camera. For instance, a particularly vulnerable section of pipeline may have pipeline equipment 413 comprising a camera that may allow remote inspection of said pipeline equipment 413. Cameras may transmit image data to the processor 220 via a network 150, which may then be presented to the user via the user interface 411. This view data may be in the form of pictures or video, which may be monitored by users 405 of the system 400. In one preferred embodiment, image data may be stored in databases 115 for later use. For instance, police may later examine image data of the system 400 to track a suspect after suspected vandalization of the pipeline. In another preferred embodiment, pipeline equipment 413 may comprise an emergency switch that may allow employees to alert users of an emergency situation not yet detected by the system 400, wherein the alert data transmitted by the emergency switch includes the exact geolocation of the emergency.

In order for the system 400 to collect geolocation data, some preferred embodiments of the system 400 may further comprise a geolocation device. The geolocation device may be a single component of a larger computing entity 200. For instance, the geolocation device may be a part of the solenoid valve 705 as illustrated in FIG. 7. A computing entity 200 is intended to represent various forms of digital computers, such as laptops, desktops, workstations, servers, databases, mainframes, and other appropriate computers. In one preferred embodiment, the geolocation device may comprise a plurality of devices working together to obtain a geolocation via triangulation. In a preferred embodiment, the geolocation device is a GPS sensor. The GPS sensor may measure and transmit geospatial data relevant for determining geolocation. A GPS sensor may be defined as a receiver having an antenna designed to communicate with a navigation satellite system. Geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a geographic information system (GIS). Vector data may be data that has a spatial component, or X, Y coordinates assigned to it. Vector data may contain sets of points, lines, or polygons that are referenced in a geographic space. Raster data may be data in a JPG, .TIF, .GIF or other picture file format. For instance, a map scanned in a flatbed scanner may be considered raster data.

In another preferred embodiment, the geolocation device is part of a mobile computing device 350. A mobile computing device 350 is intended to represent mobile variations of computing devices, such as scanners, scanning devices, personal digital assistants, cellular telephones, smart phones, tablet computers, and other similar devices. For instance, a geolocation device within an employee's smart phone may be used to provide the employee's geolocation to the system 400, as illustrated in FIG. 8. A mobile computing device 350 may include a processor 220, memory, peripheral device (such as a display, communication interface, and a transceiver, among other components), geolocation device, and non-transitory computer-readable medium 416. Preferably, each of the components of the mobile computing device 350 are interconnected using a bus, which may allow several of the components of the mobile computing device 350 to be mounted on a common motherboard or in other manners as appropriate. In some implementations, a computer program may be tangibly embodied in a storage device of the mobile computing device 350. The computer program may contain instructions that, when executed by the processor 220, perform one or more methods, such as those described herein. In an embodiment, the storage device is preferably a computer-readable medium, such as memory, expansion memory, or memory on the processor 220 such as ROM, that may be received via a transceiver or an external interface of the mobile computing device 350.

In some preferred embodiments, the system 400 may use artificial intelligence (AI) techniques to create compliance scores and/or audit warnings for pipeline profiles 435. The term "artificial intelligence" and grammatical equivalents thereof are used herein to mean a method used by the system 400 to correctly interpret and learn from data of the system 400 or a fleet of systems 400 in order to achieve specific goals and tasks through flexible adaptation. Types of AI that may be used by the system 400 include, but are not limited to, machine learning, neural network, computer vision, or any combination thereof. The system 400 preferably uses machine learning techniques to learn what equipment data 435A, employee data 430B, and rules and regulations data 440 is relevant and which is not, wherein the instructions carried out by the processor 220 for said machine learning techniques are stored on the CRM. Machine learning techniques that may be used by the system 400 include, but are not limited to, regression, classification, clustering, dimensionality reduction, ensemble, deep learning, transfer learning, reinforcement learning, or any combination thereof.

The system 400 may use more than one machine learning technique to generate audit warnings for pipeline profiles 435. For instance, the system 400 may use a combination of natural language processing and reinforcement learning to learn an audit pattern for a particular pipeline profile 435 and/or piece of pipeline equipment 413 so that it may determine the likelihood that an audit will occur within a specified period of time. Machine learning techniques may also be used to determine a compliance score for a pipeline profile 435. In one preferred embodiment, the system 400 may recommend ways in which a user may increase the compliance score for a pipeline profile 435. For instance, the system 400 may use supervised deep learning combined with results from computer-aided detection to deduce that other pipeline profiles 435 that have avoided fines are most likely to have the highest rates of inspection compliance for a particular type of pipeline equipment 413, and thus recommend that the user prioritize inspection of that type of pipeline equipment 413. Over time, the system 400 may obtain more knowledge about state and/or federal inspections, allowing it to make more intelligent decisions about how to best recommend what actions to take to increase the compliance score.

To determine the compliance score, pipeline equipment data 435A, employee data 430B, and rules and regulations data 440 is gathered and compiled. Based on this data, the system may generate a compliance score that may describe the quality of compliance for a particular pipeline profile 435. In a preferred embodiment, the compliance score is calculated by the system using qualitative analysis methods. This may be performed by the system by determining the compliance level of a particular pipeline using pipeline equipment data 435A associated with said pipeline profile 435. For instance, the system 400 may use date of last inspection data 430A, compliance data, and geolocation data to predict a pass likelihood that a pipeline profile 435 and/or piece of pipeline equipment 413 may pass inspection and then transform said pass likelihood into a compliance score by assigning a value thereto. For instance, the system 400 may use geolocation data and device type data to predict how much the remaining life expectancy for a particular piece of pipeline equipment 413, which the system may then use to adjust the compliance score. Therefore, the age and location of pipeline equipment 413 within a pipeline system may be used to influence the compliance score for a particular pipeline system.

In another preferred embodiment, the system 400 may calculate the compliance score using a quantitative data analysis. For instance, the compliance score may comprise a plurality of categories that grade the compliance of a pipeline system with rules and regulations data 440 based on different criteria having defined limits. In one preferred embodiment, the system may compare the equipment data 435A and employee data 430B to a compliance limit 440A, wherein a compliance limit 440A places a compliance value on a category if the data within that category falls within a defined range. For instance, a piece of pipeline equipment 413 may receive one point towards compliance in a "date of last inspection" category if a piece of pipeline equipment 413 within a pipeline profile 435 was inspected within the last five months. For instance, if a piece of pipeline equipment 413 has been repaired more than three times in the past year and not been replaced, that piece of pipeline equipment 413 may receive zero points towards a pipeline profile's 435 compliance score since the chance of failure for that particular piece of pipeline equipment 413 is higher than what the managing user of the system 400 is comfortable allowing. This type of analysis may be useful to users 405 of the system 400 that more personalized control of how the compliance score is generated for their particular pipeline profiles 435.

In some preferred embodiments, a plurality of sensors 414 may be used to collect equipment data 435A for the system 400. Sensors that may be used as the plurality of sensors 414 include, but are not limited to, thermometers, gas sensors, barometers, GPS, or any combination thereof. In one preferred embodiment, the system 400 may use this equipment data 435A to generate a safety score and subsequently compare said safety score to a safety threshold 440B. The safety threshold 440B may be set manually within the user interface 411 of the system 400 by a user 405 or may be generated by the system 400 using machine learning techniques. In one embodiment, the system 400 may customize the safety threshold 440B using equipment data 435A from the plurality of sensors 414. For instance, pipeline equipment 413 located in the desert may have different temperature thresholds that are considered acceptable when compared to pipeline equipment located in a frozen tundra. Types of thresholds that may act as a safety threshold 440B include temperatures, ppm gas measurements, and barometric pressure drops indicative of severe weather. When the safety score of the pipeline equipment 413 passes the predefined limit of a safety threshold 440B, the system 400 may send a computer readable signal to a user 405 to alert said user 405 of a potential safety issue with said pipeline equipment 413. In another preferred embodiment, the system 400 may cause the solenoid valves 705 to shut down the affected sections of pipeline equipment 413 when the safety score violates the safety threshold 440B.

To prevent un-authorized users 405 from accessing data within the user profiles 430 and pipeline profiles 435 of the system 400, the system 400 may employ a security method. As illustrated in FIG. 6, the security method of the system 400 may comprise a plurality of permission levels 600 that may allow a user 405 to view content 615, 635, 655 within the database 115 while simultaneously denying users 405 without appropriate permission levels 600 the ability to view said content 615, 635, 655. To access the data stored within the database 115, users 405 may be required to make a request via a user interface 411. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to content 615, 635, 655 stored within the system 400. Conversely, if the requesting user's 605, 625, 645 permission level 600 is insufficient, the processor 220 may deny the requesting user 605, 625, 645 access to content 615, 635, 655 stored within the system 400. In an embodiment, permission levels 600 may be based on user roles 610, 630, 650 and administrator roles 670, as illustrated in FIG. 6. User roles 610, 630, 650 allow users 405 to access content 615, 635, 655 that a user 405 has uploaded and/or otherwise obtained through use of the system 400. Administrator roles 670 allow administrators 665 to access system wide data, including managerial permissions, as well as assign new tasks to other users 405.

In an embodiment, user roles 610, 630, 650 may be assigned to a user 405 in a way such that a requesting user 605, 625, 645 may access user profiles 430 and pipeline profiles 435 via the user interface 411. To access the data within the database 115, a user 405 may make a user request via the user interface 411 to the processor 220. In an embodiment, the processor 220 may grant or deny the request based on the permission level 600 associated with the requesting user 605, 625, 645 assigned via user roles 610, 630, 650. Only users 405 having appropriate user roles 610, 630, 650 or administrator roles 670 may access the content 615, 635, 655. For instance, as illustrated in FIG. 6, requesting user 1 605 has a permission level 600 to view user 1 content 615 whereas requesting user 2 625 has a permission level 600 to view user 1 content 615, user 2 content 635, and user 3 content 655. Alternatively, content 615, 635, 655 may be restricted in a way such that a user 405 may only view a limited amount of content 615, 635, 655. For instance, requesting user 3 645 may be granted a permission level 600 that only allows them to view user 3 content 655 related to a particular inspection of a particular piece of pipeline equipment 413. Therefore, the permission levels 600 of the system 400 may be assigned to users 405 in various ways without departing from the inventive subject matter described herein.

FIG. 9 provides a flow chart 900 illustrating certain, preferred method steps that may be used to carry out the method of monitoring pipeline equipment 413. Step 905 indicates the beginning of the method. During step 910, the processor 220 may receive input from a user via the user interface 411 that instructs the processor 220 to retrieve equipment data 435A for a particular piece of pipeline equipment 413 and/or pipeline profile 435. The processor 220 then retrieves equipment data 435A and rules and regulations data 440 from the computer readable medium and/or database 115 regarding inspections during step 915. Once retrieved, the system may perform a query to determine if there are any pipeline equipment 413 is past an inspection deadline or within a certain specified timeframe of an inspection deadline by comparing the inspection data 430A to the rules and regulations data 440 during step 920. The processor 220 may take an action based on the results of the query during step 925. If the processor 220 determines that no inspection data 430A is past an inspection deadline or within a certain specified timeframe of an inspection deadline, the processor 220 may proceed to the terminate method step 950.

If the processor 220 determines that there is inspection data 430A past an inspection deadline or within a certain specified timeframe of an inspection deadline, the processor 220 may retrieve inspection forms related to any pipeline equipment 413 that meets those requirements during step 927 and subsequently display the inspection forms to the user within the user interface 411 during step 930. The system may modify the inspection form using input data received from the user via the user interface 411 during step 935. The system may then save the modified inspection report to the non-transitory computer-readable medium during step 940. Once saved, the system may modify the inspection data 430A for the inspected pipeline equipment 413 during step 945 before subsequently proceeding the terminate method step 950. In some preferred embodiments, the inspection report and/or inspection data 430A are transferred by the processor 220 to the database 115 once saved on the non-transitory computer-readable medium, thus allowing a user to perform inspections in geographic areas not having network 150 connectivity and automatically updating the system once network 150 connectivity has been reestablished.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for managing pipeline systems comprising:
a pipeline system connected to a network,
    wherein a plurality of sensors connected to pipeline equipment of said pipeline system collect equipment data,
a processor operably connected to said pipeline system,
    wherein said processor is configured to receive said equipment data via said network,
a computing device operably connected to said processor and having a user interface,
    wherein said user interface allows a user to choose pipeline equipment within a geographic information system (GIS) of said user interface, and
    wherein said user interface is presented to said user via a display operably connected to said computing device,
a database operably connected to said processor,
    wherein said database contains rules and regulation data, and
a non-transitory computer-readable medium coupled to said processor,
    wherein said non-transitory computer-readable medium contains instructions stored thereon, which, when executed by said processor, cause said processor to perform operations comprising:
        receiving said equipment data from said pipeline system,
        receiving input entered into said user interface by an employee via an input device,
        receiving at least one of inspection data, compliance data, and
            geolocation data of said pipeline equipment from said database,
        receiving employee data from said database,
        retrieving said rules and regulation data from said database,
        comparing said equipment data to said rules and regulation data in order to determine if said pipeline equipment is noncompliant pipeline equipment, generating an inspection report for said noncompliant pipeline equipment, and sending a computer readable signal to alert a user that said pipeline equipment is said noncompliant pipeline equipment, creating a modified inspection report using said inspection report and said input, saving said modified inspection report on said non-transitory computer-readable medium, modifying said equipment data based on said input entered into said user interface by said employee, checking said employee data to determine that said employee is qualified to inspect said pipeline equipment, and sending a computer readable signal to said computing device upon a determination that said employee is qualified to inspect said pipeline equipment, determining similar pipeline equipment using said equipment data, wherein said similar pipeline equipment is a same equipment type as said pipeline equipment within said equipment data, receiving at least one of inspection data, compliance data, and geolocation data of said similar pipeline equipment from said database, determining a pass likelihood that said pipeline equipment will pass an inspection by comparing said inspection data and at least one of said compliance data and said geolocation data of said pipeline equipment to said inspection by comparing said inspection data and at least one of said compliance data and said geolocation data of said similar pipeline equipment.

2. The system of claim 1, further comprising additional instructions stored on said non-transitory computer-readable medium, which, when executed by said processor, cause said processor to perform additional operations comprising, transforming said pass likelihood into a compliance score for said pipeline equipment based on said inspection data and at least one of said compliance data and said geolocation data of said pipeline equipment.

3. The system of claim 1, further comprising additional instructions stored on said non-transitory computer-readable medium, which, when executed by said processor, cause said processor to perform additional operations comprising:

receiving employee data from said database, comparing said employee data to a compliance limit of said pipeline equipment, wherein a plurality of categories within said compliance limit have a defined range, creating a compliance value for a category of said plurality of categories based on said employee data and said defined range, and determining a compliance score using said compliance value of said plurality of categories.

4. The system of claim 1, further comprising at least one solenoid valve operably connected to said pipeline equipment and said processor, wherein said at least one solenoid valve is configured to stop a flow of gas through said pipeline equipment.

5. The system of claim 4, further comprising additional instructions stored on said non-transitory computer-readable medium, which, when executed by said processor, cause said processor to perform additional operations comprising:

sending a computer readable signal to said at least one solenoid valve when said pipeline equipment is said noncompliant pipeline equipment, wherein said computer readable signal instructs said at least one solenoid valve to stop said flow of gas through said pipeline equipment.

6. The system of claim 1, wherein said user interface allows said user to select said pipeline equipment within a GIS, wherein said user interface allows said user to select an employee profile of an employee in order to assign an inspection of said pipeline equipment selected within said GIS.

7. A system for managing pipeline systems comprising:

a pipeline system connected to a network, wherein a plurality of sensors connected to pipeline equipment of said pipeline system collect equipment data, a processor operably connected to said pipeline system, wherein said processor is configured to receive said equipment data via said network, a database operably connected to said processor, wherein said database contains rules and regulation data, a computing device operably connected to said processor and having a user interface, wherein said user interface allows a user to choose pipeline equipment within a geographic information system (GIS) of said user interface, wherein said user interface is presented to said user via a display operably connected to said computing device, and a non-transitory computer-readable medium coupled to said processor, wherein said non-transitory computer-readable medium contains instructions stored thereon, which, when executed by said processor, cause said processor to perform operations comprising:

receiving said equipment data from said pipeline system, receiving employee data from said database, retrieving said rules and regulation data from said database, comparing said equipment data to said rules and regulation data in order to determine if said pipeline equipment is noncompliant pipeline equipment, generating an inspection report for said noncompliant pipeline equipment, sending a computer readable signal to alert a user that said pipeline equipment is said noncompliant pipeline equipment, receiving input entered into said user interface by said user, creating a modified inspection report using said inspection report and said input, saving said modified inspection report on said non-transitory computer-readable medium, and modifying said equipment data based on said input entered into said user interface by said user, comparing said employee data to a compliance limit of said pipeline equipment, wherein a plurality of categories within said compliance limit have a defined range, creating a compliance value for a category of said plurality of categories based on said employee data and said defined range, and determining a compliance score using said compliance value of said plurality of categories.

8. The system of claim 7, further comprising at least one solenoid valve operably connected to said pipeline equipment and said processor,
wherein said at least one solenoid valve is configured to stop a flow of gas through said pipeline equipment.

9. The system of claim 8, further comprising additional instructions stored on said non-transitory computer-readable medium, which, when executed by said processor, cause said processor to perform additional operations comprising:
sending a computer readable signal to said at least one solenoid valve when said pipeline equipment is said noncompliant pipeline equipment,
wherein said computer readable signal instructs said at least one solenoid valve to stop said flow of gas through said pipeline equipment.

10. The system of claim 9, further comprising said additional instructions stored on said non-transitory computer-readable medium, which, when executed by said processor, cause said processor to perform said additional operations comprising:
receiving at least one of inspection data, compliance data, and geolocation data of said pipeline equipment from said database,
determining similar pipeline equipment using said equipment data,
wherein said similar pipeline equipment is a same equipment type as said pipeline equipment within said equipment data,
receiving at least one of inspection data, compliance data, and geolocation data of said similar pipeline equipment from said database, and
determining a pass likelihood that said pipeline equipment will pass an inspection by comparing said inspection data and at least one of said compliance data and said geolocation data of said pipeline equipment to said inspection by comparing said inspection data and at least one of said compliance data and said geolocation data of said similar pipeline equipment.

11. The system of claim 10, further comprising said additional instructions stored on said non-transitory computer-readable medium, which, when executed by said processor, cause said processor to perform said additional operations comprising,
transforming said pass likelihood into a compliance score for said pipeline equipment based on said inspection data and at least one of said compliance data and said geolocation data of said pipeline equipment.

12. The system of claim 11, further comprising said additional instructions stored on said non-transitory computer-readable medium, which, when executed by said processor, cause said processor to perform said additional operations comprising:
sending a computer readable signal to said at least one solenoid valve when said compliance score is below a safety threshold,
wherein said computer readable signal instructs said at least one solenoid valve to stop said flow of gas through said pipeline equipment,
wherein said safety threshold is a minimum value of said compliance score, and
wherein said minimum value represents an unacceptable failure likelihood of said pipeline system.

\* \* \* \* \*